US012581038B2

(12) United States Patent
Larsen et al.

(10) Patent No.: US 12,581,038 B2
(45) Date of Patent: Mar. 17, 2026

(54) AUDIO PROCESSING IN VIDEO CONFERENCING SYSTEM USING MULTIMODAL FEATURES

(71) Applicant: GN HEARING A/S, Ballerup (DK)

(72) Inventors: Valdemar Ettrup Larsen, Ballerup (DK); Henning Toft Schwarz, Ballerup (DK); Elias Lundgaard Pedersen, Ballerup (DK); Robert James, Ballerup (DK); Anuj Dutt, Ballerup (DK)

(73) Assignee: GN HEARING A/S, Ballerup (DK)

( * ) Notice: Subject to any disclaimer, the term of this patent is extended or adjusted under 35 U.S.C. 154(b) by 189 days.

(21) Appl. No.: 18/543,126

(22) Filed: Dec. 18, 2023

(65) Prior Publication Data

US 2025/0203045 A1      Jun. 19, 2025

(51) Int. Cl.
*H04N 7/15* (2006.01)
*H04N 7/14* (2006.01)

(52) U.S. Cl.
CPC ............. *H04N 7/157* (2013.01); *H04N 7/147* (2013.01); *H04N 7/152* (2013.01)

(58) Field of Classification Search
CPC ......... H04N 7/157; H04N 7/147; H04N 7/152
See application file for complete search history.

(56) References Cited

U.S. PATENT DOCUMENTS

| | | | |
|---|---|---|---|
| 2015/0156598 A1 | 6/2015 | Sun et al. | |
| 2017/0098453 A1 | 4/2017 | Wright et al. | |
| 2020/0344278 A1 | 10/2020 | Mackell et al. | |
| 2020/0412772 A1* | 12/2020 | Nesta ...................... | G06F 3/165 |
| 2021/0051037 A1* | 2/2021 | Atkins ................ | G06V 10/993 |
| 2021/0345040 A1* | 11/2021 | Meyer .................... | H04R 3/005 |
| 2022/0086564 A1* | 3/2022 | Bou Daher ............ | H04R 3/005 |
| 2022/0210341 A1* | 6/2022 | Hwang ................... | G06V 40/70 |
| 2022/0382907 A1 | 12/2022 | Siohan et al. | |
| 2024/0071356 A1* | 2/2024 | Gu ............................ | H04S 3/008 |
| 2024/0119731 A1* | 4/2024 | Hammer ................ | G06V 40/23 |
| 2024/0185449 A1* | 6/2024 | Bhatt ....................... | H04N 7/15 |
| 2024/0185876 A1 | 6/2024 | Zhang et al. | |
| 2024/0214520 A1* | 6/2024 | Dao .......................... | G06T 7/20 |

FOREIGN PATENT DOCUMENTS

WO      2022262316 A1      12/2022

OTHER PUBLICATIONS

The extended European search report issued in European Application No. 24153086.4, dated Jun. 27, 2024.

* cited by examiner

*Primary Examiner* — Stella L. Woo

(74) *Attorney, Agent, or Firm* — HSML P.C.

(57) ABSTRACT

The disclosure relates to a method for processing audio signals in a video conference call. At first, virtual room boundaries defining space relevant for the video conference call are determined. By at least one input transducer, audio data are obtained and by at least one camera, video data are obtained. The video data and audio data are then correlated. On the basis of the correlation and defined virtual room boundaries, the audio data are modified and modified output audio data are generated.

15 Claims, 3 Drawing Sheets

20

22 — determining virtual room boundaries

24 — obtaining audio data

26 — obtaining video data

28 — correlating audio and video data

30 — modify audio data

32 — generate output audio data

Output audio data

AUDIO PROCESSING IN VIDEO CONFERENCING SYSTEM USING MULTIMODAL FEATURES

TECHNICAL FIELD

The present disclosure relates to signal processing of an audio signal in video conferencing system by using multimodal features. More specifically, the disclosure relates to audio processing as defined in the introductory part of claim 1.

BACKGROUND ART

Hybrid meetings have a demand for high quality audio and video signals. The ideal video conferencing solution should thereby only transmit the signal containing concise information and context. This is shown to increase productivity and decrease fatigue for all participants.

Audio noise suppression is currently applied to conferencing systems to limit outside noise. However, this method does not work well with removing unwanted speech. Users therefore currently mitigate the issue by using physical boundaries, e.g., using closed meeting rooms. However, there is a movement towards open hybrid meeting spaces, in which currently known methods are inferior. Some vendors have implemented acoustic fencing in their conferencing systems. However, these are often fixed and do not provide the best solution for changing meeting setups.

There is thus a need for an improved signal processing method and system which provides a good quality signal for other recipient(s).

SUMMARY

It is an object of the present disclosure to mitigate, alleviate or eliminate the above-identified deficiency and disadvantage in the prior art and solve at least the above-mentioned problem.

In particular, it is an object of the embodiments of the present disclosure to provide a system and a method for audio signal processing which provide a clean audio signal, and in particular clear speech signals with high intelligibility.

The advantage of the present disclosure is that space boundaries are defined prior to the start of the conference call and can be virtual boundaries, instead of a fixed fence.

It is a further object of the embodiments of the present disclosure to provide a system and a method which enable use of any space suitable for a meeting of any size while ensuring transmission of audio signals with a high signal-to-noise ratio.

It is a yet further object of the present disclosure to provide a system and a method for filtering out unwanted speech.

According to a first aspect there is provided a method for processing audio signals in a video conference call. The method comprises determining virtual room boundaries. The virtual room boundaries define space relevant for the video conference call. The method further comprises obtaining, by at least one input transducer, such as a microphone, audio data and obtaining, by at least one camera, video data. The method further comprises correlating the video data and audio data and modifying the audio data on the basis of the correlation and defined virtual room boundaries to generate output audio data.

The method of the present disclosure is directed to processing audio signals which may be present in a conference room, the conference room being either at a near-end of at a far-end. In the present context, the term "audio signals" may be understood as any representation of sound that includes speech but also other types of sounds such as noise, music, etc. The audio signals are picked up by input transducers, such as microphones, and sent to a processing unit for signal processing. Audio signals processed at the near-end are then sent to video conference call participants joining the call from a far-end location. In some examples, audio signals obtained at the far-end location may be sent to the near-end location without processing, and the processing may then be performed at the near-end location before being output to the participants present at the near-end location. The near-end location may be understood as a location where the audio processing is performed. The far-end location may be understood as a location receiving the processed audio data (and video data) or as a location sending unprocessed audio data for processing at the near-end and output at the near-end.

In the present context, the video conference call is to be understood as a live video-based meeting between two or more participants in different locations. During the conference call, at least one of the participants is using video-enabled devices. Video conference call allows multiple people to meet and collaborate face to face over long distances by transmitting audio, video, text and presentations in real time through the internet. At least one participant may join the video conference call from home, from an office, from a conference room, from an open space office, a common space, or even from any outdoor space.

The virtual room boundaries define space relevant for the video conference call at one location. The virtual room boundaries may be determined manually, automatically or by user input. For instance, a conference call organizer may preselect space relevant for the conference call by choosing dimensions of the active space to be considered for the conference call. In another example, the conference call organizer may manually define the space of interest by taking an initial video capture in which the organizer walks along lines defining the virtual space boundaries. Additionally, a number of active participants may be preselected manually. The virtual room boundaries define the space that will be provided to participants of the conference call joining from other location(s). The virtual room boundaries may also define a number of participants of the conference call joining from the relevant location.

At least one microphone that may be arranged within the virtual room boundaries is configured to obtain audio data. Obtaining the audio data is typically performed by several microphones. The microphones may be comprised in a device performing the method of the present disclosure. Alternatively, the microphones may be comprised in a personal computer, tablet, or a mobile phone. In this case, typically, the method will be performed on the personal computer, tablet, or the mobile phone. The one or more microphones are configured to pick up acoustic signals present in the environment where one or more participants are located and convert these acoustic signals into the audio data.

In the present context, the audio data is to be understood as any acoustic signal present in the space of the conference call, picked up by the one or more microphones used for the conference call and converted into an electronic signal.

At least one camera that may be arranged within the virtual room boundaries is configured to obtain video data.

Obtaining the video data is typically performed by several cameras. The cameras may be comprised in a device performing the method of the present disclosure. Alternatively, the cameras may be comprised in a personal computer, tablet, or a mobile phone. In this case, typically, the method will be performed on the personal computer, tablet, or the mobile phone. The one or more cameras obtain video data of the environment of one or more participants located in one location. The video data, in the present context, is any video or a combination of videos obtained by the cameras arranged at the relevant location and converted into an electronic signal.

Once the audio data and the video data present at one location are obtained, these data are correlated. Audio and video data correlation refers to the relationship between the audio (sound) and video (visual) components obtained by the microphone(s) and camera(s). The correlation may involve comparison, synchronization, alignment, and meaningful connection between the audio and video data to thereby provide a link between the video data and sounds present in the audio data. Audio and video data correlation may include audio and video data analysis and mapping in order to determine sources of various acoustic signals present in the audio data. Correlation of the audio and video data can be understood as content analysis of both audio and video data and their mapping and comparison. In one example, from the video data, a person not facing any of the cameras can be identified and at the same time, from the audio data, it can be identified that a speech signal originates from a location of the same person. The correlation ensures that the speech is linked to the person identified by the camera.

When the link and mapping of the audio and video data is determined through correlation, the audio data are modified and output as output audio data. The modification takes into account the defined virtual room boundaries and the content of the audio data mapped onto the video data such that at least any acoustic sounds originating from outside of the virtual boundaries and any acoustic sound originating from an object or a person not relevant for the video conference call are filtered out. Additionally, any noise signal may be filtered out. Furthermore, any speech signal of interest may be processed and enhanced in order to obtain cleaner and shaper speech. Thereby, the modified audio data, i.e. the output audio data, represent an improved original audio data signal, improved in terms of noise and speech recognition.

By providing a modified output audio data modified on the basis of video and audio data correlation and virtual room boundaries, improved audio data is transmitted. The output data is sharper, optimally does not contain any interfering noise, and preferably contains only speech signals.

In some embodiments, the method comprises determining one or more speech signals present in the audio data.

Speech signals are typically of the greatest interest during any video conference call. The determined one or more speech signals may be correlated with the video data, the audio data may then be modified based on the correlation and the determined virtual room boundaries. The determined one or more speech signals may be used for determination of one or more direction of arrivals, DoA, of speech associated with the one or more speech signals. The one or more DoAs determined may be correlated with the video data. The determined speech signals may be used in combination with the virtual room boundaries and the video data to thereby determine whether the determined speech is within room boundary-if it is, the speech signal may be transmitted to another end of the conference call and if it is not within the boundaries, it may be fully suppressed or at least partly suppressed. The determined speech signals may be transmitted and presented to conference call participants located at another location.

The one or more speech signals may be determined based on a voice activity detection algorithm. The one or more speech signals may be determined based on a speech presence probability algorithm.

Therefore, it should be ensured that the speech signals present in the audio data are output with good quality. Speech may be extracted from the audio data by using any method available in the art, such as beamforming, noise reduction, echo control, independent component analysis, wiener filtering, or the like. Speech extraction is typically accompanied by noise filtering. By extracting speech signals from the audio data, it is ensured that interference from sources other than speakers are suppressed. In some cases, there may be multiple speakers talking at the same time. The method may comprise a step of separating simultaneous speech signals from different participants, by, e.g., Artificial intelligence (AI) beamformers, single/multi-channel source separation, etc., and possibly using the video data to determine speech with higher priority. Therefore, the step of extracting speech signals may be performed before correlation of the audio and video data. When the speech signals are determined, and other interfering signals preferably suppressed from the audio data, the speech signals may be correlated with the video data while taking into account the virtual room boundaries. In particular, having the virtual room boundaries defined may disregard speeches originating from space outside of these boundaries. The speech signals not within the boundaries may therefore not form part of correlation with the video data. By determining the speech signals from the audio data and correlating them with the video data, an improved output audio signal in terms of speech quality and signal-to-noise ratio will be obtained and therefore an improved communication with other conference call participants will be achieved. When determining the speech signals, typically, positions of their origin within the virtual boundaries and with respect to the microphones is determined.

In some embodiments, the method comprises determining, based on the video data, a presence of one or more meeting participants.

The determined presence of one or more participants may be correlated with the audio data, the audio data may then be modified based on the correlation and the determined virtual room boundaries. The determined presence of one or more participants may be used in combination with the virtual room boundaries to thereby determine whether the determined participant is within the virtual room boundaries. The method may comprise determining if the determined speech signal corresponds to one of the identified participants. If a correspondence is found and the participant is within the virtual room boundary, the determined speech signal may be transmitted or outputted as part of the conference call. If one of the identified participants is not within the boundaries but the determined speech signal corresponds to a participant, the determined speech signal may be suppressed.

To determine the presence of one or more meeting participants in the video data various techniques may be used, such as face recognition, object tracking, machine learning, AI-based head and body detection, or any other method know in the art. As video and audio data are obtained in real time, i.e. throughout the entire conference call, presence of people may also be determined in real time. This is in particular important as, in some cases, some people may be joining the conference call after the call has started, or some people may only enter the space covered by the video cameras while being outside of the space of interest. By applying the virtual room boundaries, people identified outside of the boundaries (i.e. outside of the space of interest) may not be considered for correlation with the audio data. In other words, their speech may be excluded, attenuated or muted. By determining presence of conference call participants, and any further people present within and/or outside of the virtual room boundaries, audio signals can be improved. When determining presence of the participants, typically, their position within the virtual boundaries with respect to the cameras is determined. Furthermore, when the speech signals are isolated, speech analysis algorithms may determine priority of particular speech signals In some embodiments, the method may comprise an initial step of defining a number of participants. The method may comprise determining biomarker parameters of each meeting participant. During the step of determining, based on the video data, the presence of one or more meeting participants, the number of participants defined in the initial step may be taken into account and if the number of determined participants is larger than the number of defined participants, the method may comprise a step of determining which participants are part of the conference call and which are not. This determination may be performed by using the biomarker parameters of the participants identified in the initial step. Any additional people, i.e., people for which appropriate mapping was not found, present in the video data may be disregarded and their speech may be muted.

In some embodiments, correlating the video and audio data includes correlating the one or more speech signals and the presence of one or more meeting participants.

The method may comprise to determine the direction of arrival (DOA) based on the one or more speech signals, and the position/coordinates of each of the plurality of participants based on the video data, and correlate the DOA with the position/coordinates. Any sounds, other than speech may be filtered out. The extracted speech signals may be mapped with the identified participants, or even with other people (not part of the meeting) identified in the video data. Based on this mapping, some speech signals may be enhanced while some speech signals may be attenuated. The mapping of participants with the speech signals may be performed based on determined position of the participant with respect to the cameras and the position of the speakers with respect to the microphones. By correlating the speech signals identified by the microphones with the participants identified within the virtual room boundaries, audio signal to be communicated to other participants is of a better quality, i.e. better signal-to-noise ratio, and the communicated speech has improved intelligibility.

In some embodiments, the method comprises detecting an initial audio signal and/or an initial video signal and defining the virtual room boundaries on the basis of the detected initial audio signal and/or initial video signal.

In some examples, the virtual room boundaries may only comprise space boundaries while in some examples, the virtual room boundaries may also comprise audio boundaries; such as background noise. The initial audio signal may be only a background noise and the initial video signal may capture participants of the meeting and one of the participants may, for instance, walk around the conference room defining space of the conference room which is of interest for the conference call. The microphones may, prior to the start of the conference call, acquire an initial audio signal to determine a background noise present in the meeting space. The cameras may acquire an initial video signal with the relevant conference call participants and based on their distribution within the meeting space, the processing unit may define the virtual room boundaries. By defining the virtual room boundaries on the basis of the initial conditions within the space, the boundaries may be optimized.

In some embodiments, the method comprises receiving an input parameter and defining the virtual room boundaries on the basis of the received input parameter.

The input parameter may be automatically obtained or determined, for instance, on the basis of a video data and/or audio data obtained before the start of the conference call. Alternatively, the input parameter may be predefined by a user or may be predefined by a choice of a particular conference call mode.

In some embodiments, the method comprises assigning an identity number to each determined participant.

By assigning a number to each participant identified in the meeting, it can be ensured that any further person, appearing within the virtual room boundaries is checked and marked as a new participant or marked as a non-participant. Thereby, some of the new identified persons may be either considered in signal processing or their speech may be attenuated.

In some embodiments, the method comprises extracting, from the determined speech signals, directions of arrival (DOA) of the speech signals.

In some implementations, at least two microphones are used for determining the DOA of the relevant speech signal. The DOA may be determined by any well-known algorithms for DOA determination. Artificial intelligence (AI) may be used for analysis of the speech signals. AI audio DOA algorithms may detect the angle of arrival of currently active speech sources. DOA of the speech signal can be employed to filter out noise and interference coming from directions other than the relevant speech signal. This improves the signal-to-noise ratio and makes speech communication more intelligible. The DOA may be determined every time when a speech signal is identified.

In some embodiments, determining the presence of one or more meeting participants comprises calculating relative positions of each identified participant. The relative positions include the distance and/or the angle of a participant. The relative positions are calculated with respect to the at least one camera. The relative position of one of participants may be defined by the distance(s) of the participant from the camera(s). The distance is defined as a straight line between the participant and the relevant camera. The relative position of the participant may further be defined by angular distances between each camera and the participant. The angular distance may be defined with respect to, e.g., a geometrical center of the space defined by the virtual boundaries. The method may therefore perform participant mapping by assigning distances and angular positions to each participant present within the virtual room boundaries. By knowing the distance and angle of each participant with respect to the cameras, it is possible to adapt processing of the audio signals to accommodate for the placement of each of the participants. AI may be used for video participant mapping and detecting the distances and angular positions of the participants in the camera view. Determining relative positions of each identified participant may be performed only once at the start of the video conference call. If, from the video data, it is identified that any of the participants is moving, i.e. walking, determination of the relative position of that participant may be performed in real time.

In some embodiments, the step of correlating the video data and audio data includes correlating the directions of arrival of the speech signals and the relative positions of each identified participant. The speech signal, i.e. the DOA of the speech signal may be associated with each relative position to determine one relative position that corresponds to the DOA. The method may then check whether the relative position is within the virtual room boundaries and then, if the relative position is within the boundaries, transmit the speech signal to the far end. If the relative position is not within the boundaries, the speech signal may be suppressed. If the relative position of the speaker is outside of the boundaries, it may be considered that the speaker has left the meeting and hence the speech may be suppressed. In some scenarios, speech signals from more than one participant may be identified. By correlating the relative position of the relevant participants and the DOA of the identified speech signals, it can be ensured that the output audio signal comprises only speech signals relevant for the video conference call.

In some embodiments, the method comprises attenuating any audio signal originating from outside of the virtual room boundaries.

The audio data may comprise various audio signals and the method may comprise determining DOA and intensity of each particular audio signal comprised in the audio data. Based on DOA and the determined intensity, and/or in combination with the obtained video data, the distance or the location of the sound source of each audio signal can be determined. The determined distance may then be compared with the virtual room boundaries. If it is determined that the identified sound source is outside of the virtual room boundaries, the sound source may be attenuated, or muted. By attenuating audio sources outside of the virtual room boundaries only audio relevant for the video conference call is processed.

In some cases, the sound sources outside of the virtual boundaries may be partly attenuated. This may occur if it is identified that the sound source was at a first time point present within the virtual room boundaries and at the second time point outside the virtual room boundaries. Thereby, the sound source that may still be of interest, may still be included in the video conference call. For instance, if any of the current speakers are detected as outside the virtual boundary, the audio output may be gradually attenuated by implementing gain smoothing.

In some embodiments, the method comprises stopping one or more adaptive algorithms from adapting to speech detected outside of the virtual room boundary.

A beamformer may be configured to calculate a covariance matrix focused on an area where the speech signal is detected. The covariance matrix may dynamically change when the DOA of the speech signal changes, i.e., when the speaker is moving. If any of the current talkers are detected as outside the virtual room boundary, active beamformers may stop adapting to the current talker leaving the boundaries. Instead, the beamformers may remain in its most recent state, i.e. the covariance matrix may remain unchanged. If the participant who left, returns within the boundaries, the beamformer may continue adapting to the speaker again. Alternatively, the beamformer may be reset and start adapting to other speakers within the boundaries, i.e. a new covariance matrix may be generated. Thereby, any speech detected outside of the virtual boundary will not be picked up. This may in particular help if there are people entering and leaving the virtual room boundaries.

In some embodiments, the method comprises identifying movements of the one or more participants within the virtual room boundaries. Based on the identified movements, the method may dynamically adapt participant related parameters.

The participant related parameters may include at least one of direction of arrival and camera view. The movements may be identified from the video data. In this manner, the audio and video data are correlated. Specifically, the DOA may be dynamically updated on the basis of the identified movements of one or more participants. In some embodiments, one or more cameras may be configured to adapt its view so it is focused on one participant. Based on the identified movements of the participant, the camera view may be changed. Furthermore, by identifying movements of the participants only within the virtual room boundaries, it can be identified if the participant have left the video conference call and then disregard any audio coming from that participant.

In some embodiments, the method comprises determining a biomarker parameter for each participant and including the biomarker parameter in correlation of the video data and audio data.

The biomarker parameter may be determined by the processing unit from the video data. Biomarker parameters are parameters related to the participants, and in particular to movements and gestures during the video conference call. The biomarker parameters may be used in the signal processing of the audio data and to further improve the output audio signal. For instance, the biomarker parameters may be used in correlation with the audio data for determining participants relevant for the video conference call and those who should be dismissed. The biomarker parameters may be used in speech recognition and/or in determining active speakers. The biomarker parameters may be used for identifying people captured in the video data and to then determine their position within the virtual room boundaries.

In some embodiments, the biomarker parameter comprises one or more from the following group: a lip movement parameter, a gaze parameter, a face parameter, a body orientation parameter, a face landmark parameter, and a body landmark parameter.

Each participant may be characterized by one or more specific features. The lip movement parameter may directly relate to speech, and used for speech recognition. Other parameters, may be used for interlinking a particular person with the speech. Some common body landmarks including facial features, such as the eyes, nose, and mouth, as well as points on the limbs, joints, and spine, may also help in assigning an identity number to each participant.

In some embodiments, the lip movement parameter may be included in correlation of the video data and the audio data. The lip movement parameter may be used for speech recognition. Furthermore, there may be a scenario in which two speech signals are identified while, according to the video data, the lip movement parameter is identified for only one of the participants. The processing unit may then correlate the video data and the audio data such that the speech signal, emanating from the participant for which the lip movement parameter is not identified, is attenuated. As the lip movement parameter is not identified from the video data, it may be considered that the participant is saying something what may not be relevant for everyone participating in the conference call.

The gaze parameter may be extracted from video data. In some implementations, at least one camera may be an eye camera, specialized for eye tracking and gaze measurements. In some embodiments, the gaze parameter may be included in correlation of the video and audio data. For instance, the gaze parameter can be used to improve speech recognition and enhancement of speech. By tracking a user's gaze, the system can focus on amplifying or recognizing speech from the direction the participant is looking and filtering out background noise from other directions.

Other biomarker parameters may also be included in correlation of the video and audio data, to further improve the output audio signal, and in particular speech signals. For instance, the body orientation may be used for adapting the speech of a person that may be talking, but not facing the camera, thereby improving the output audio signal. Also, hand gestures may be extracted from video data and used for correlation with audio data, and specifically with speech signals. In particular, the speech signal of a particular participant may be correlated with hand gestures of the same participant. In some embodiments, a particular hand gesture may be assigned to a particular action, such as for instance muting and unmuting participants microphones, turning on and off one or more cameras, etc.

In some embodiments, signal processing steps of the method are performed by a processing unit. The processing unit may form part of a master device for establishing the video conference call, such as a personal computer, a mobile phone, or a separate device specially dedicated for video conference calls. The signal processing steps may include correlation of the video data and the audio data, modification of the audio data to generate the output audio, determining speech signals, determining participants, etc.

In some embodiments, the method comprises determining virtual room boundaries, where the virtual room boundaries define space relevant for the video conference call. The method comprises obtaining audio data. The method comprises obtaining video data. The method comprises determining one or more speech signals present in the audio data. The method comprises determining, based on the one or more determined speech signals, one or more directions of arrival of the one or more speech signals. The method comprises determining, based on the video data, presence of one or more meeting participants, where determining the presence of one or more meeting participants comprises determining relative positions of each identified participant, where the relative positions include the distance and/or the angle of a participant. The method comprises correlating the video and audio data, where correlating the video and the audio data comprises correlating the one or more directions of arrival of the one or more speech signals and the relative positions of each identified participant. The method comprises modifying the audio data on the basis of the correlation and defined virtual room boundaries to generate output audio data.

The modification of the audio data may comprise attenuating or suppressing a speech signal correlated with a relative position outside the determined virtual room boundaries.

According to a second aspect there is provided a video conference device. The device comprises one or more microphones for obtaining audio data, one or more cameras for obtaining video data, and a processing unit. The processing unit is configured to determine one or more virtual room boundaries, wherein the virtual room boundaries define space relevant for a video conference call. The processing unit is further configured to determine a correlation between the video data and audio data, and modify the audio data based on the determined correlation and defined virtual room boundaries to generate output audio data.

The present disclosure will become apparent from the detailed description given below. The detailed description and specific examples disclose preferred embodiments of the disclosure by way of illustration only. Those skilled in the art understand from guidance in the detailed description that changes and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above objects, as well as additional objects, features and advantages of the present disclosure, will be more fully appreciated by reference to the following illustrative and non-limiting detailed description of example embodiments of the present disclosure, when taken in conjunction with the accompanying drawings.

DETAILED DESCRIPTION

Figure 1:
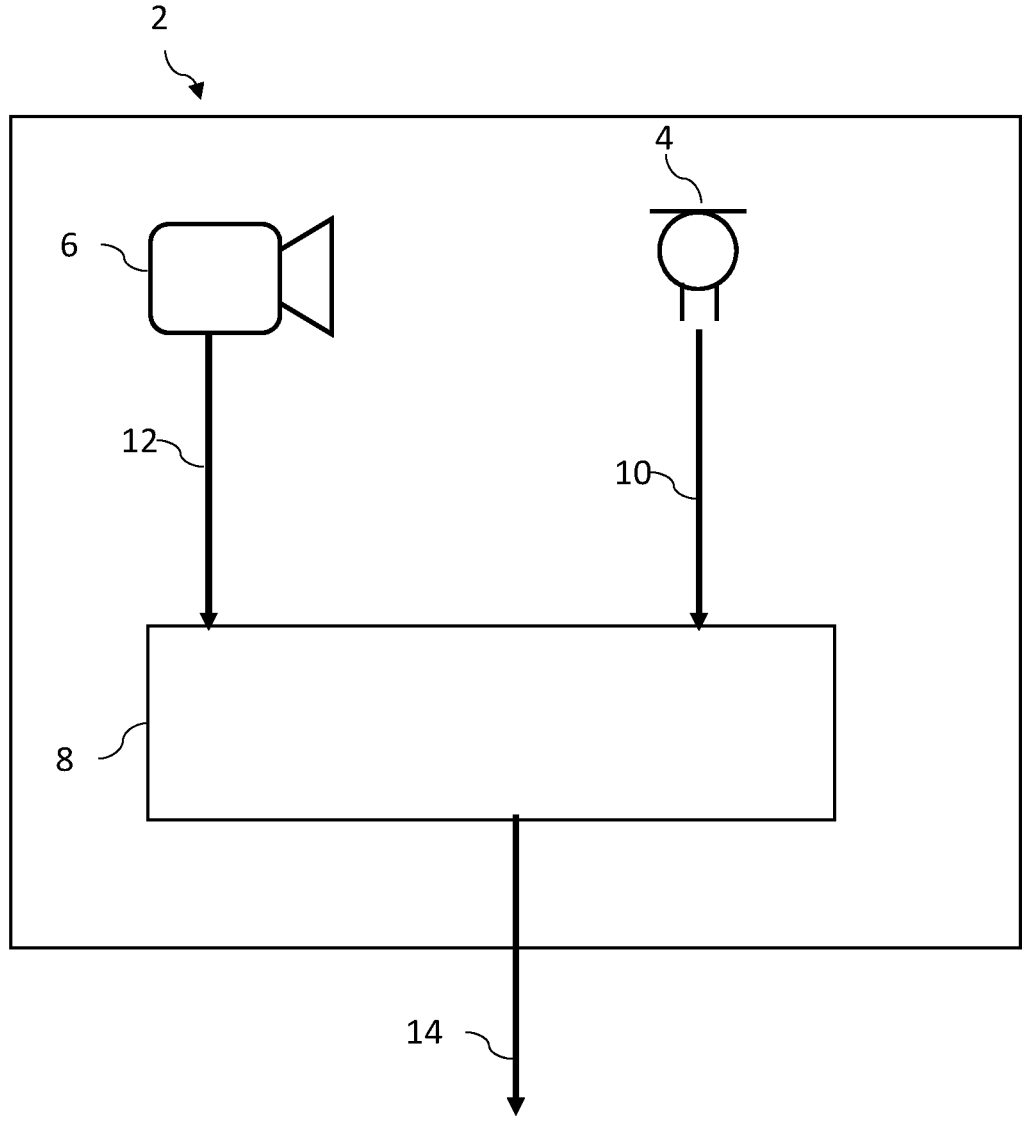
FIG. 1 schematically illustrates video conference device for processing audio signals in a video conference call according to one embodiment of the disclosure.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed disclosure or as a limitation on the scope of the claimed disclosure. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

FIG. 1 schematically illustrates a video conference device 2 for processing audio signals in a video conference call according to one embodiment of the disclosure. The video conference device 2 comprises an input transducer, such as a microphone 4, for obtaining audio data 10, one or more cameras 6 for obtaining video data 12, and a processing unit 8. The device may comprise a microphone array instead of a single microphone 4. Also, there may be multiple cameras instead of the single camera 6. The processing unit 8 receives the audio data 10 and video data 12 from the microphone(s) 4 and camera(s) 6. The processing unit 8 is configured to determine one or more virtual room boundaries, wherein the virtual room boundaries define space relevant for a video conference call. The processing unit 8 is further configured to determine a correlation between the video data 12 and audio data 10, and modify the audio data 10 based on the determined correlation and defined virtual room boundaries to generate output audio data 14.

Figure 2:
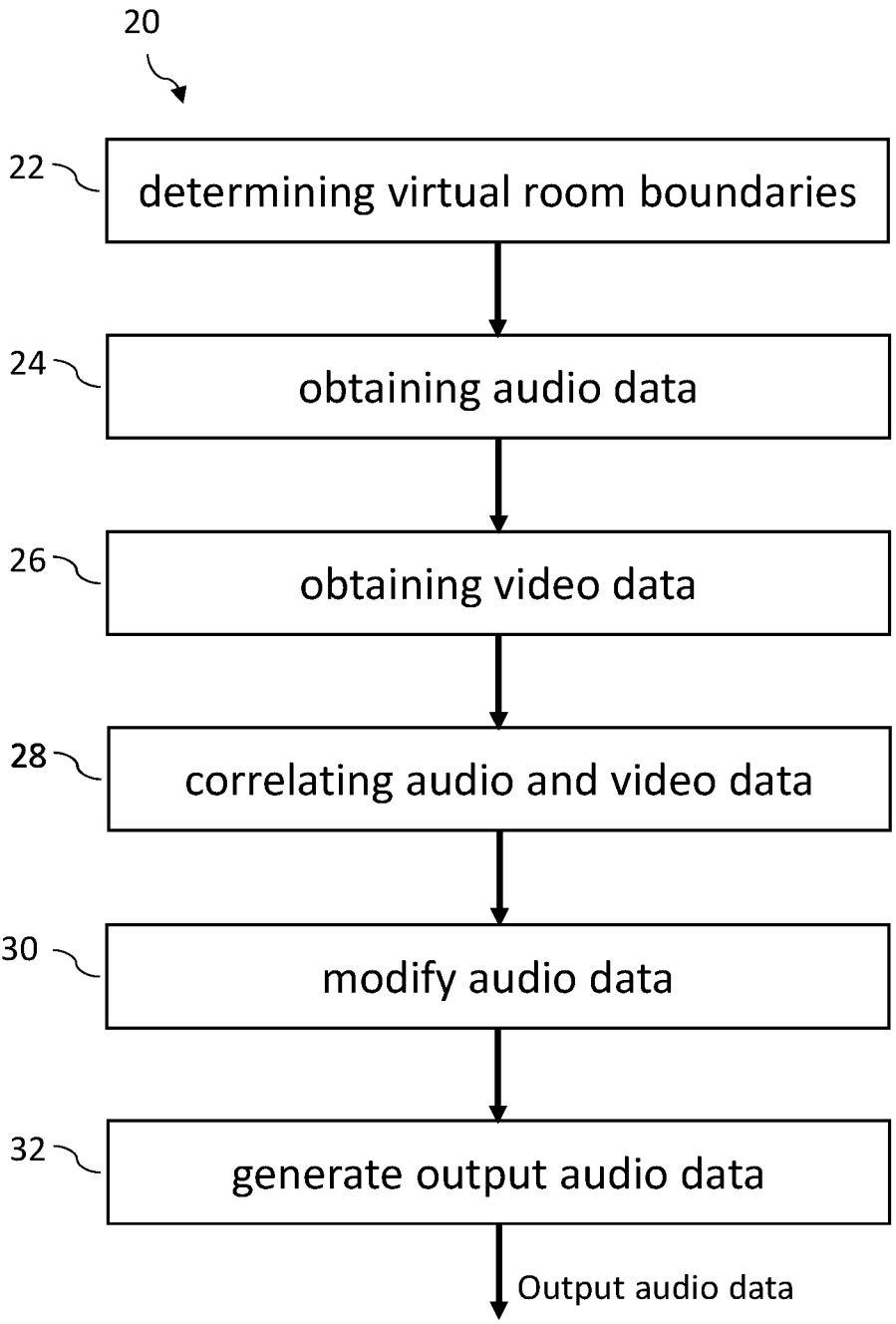
FIG. 2 schematically illustrates a method for processing audio signals in a video conference call according to one embodiment of the disclosure.

FIG. 2 illustrates a method 20 for processing audio signals in a video conference call according to one embodiment of the disclosure. The method comprises step 22 of determining virtual room boundaries, wherein the virtual room boundaries define space relevant for the video conference call. The method further comprises step 24 of obtaining, by at least one input transducer, such as a microphone, audio data and step 26 of obtaining, by at least one camera, video data. The method further comprises step 28 of correlating the video data and audio data and step 30 of modifying the audio data on the basis of the correlation and defined virtual room boundaries to generate 32 output audio data.

By providing a modified output audio data modified on the basis of video and audio data correlation and virtual room boundaries, an improved audio data is transmitted. The output data is sharper, optimally does not contain any interfering noise, and preferably contains only speech signals.

Figure 3:
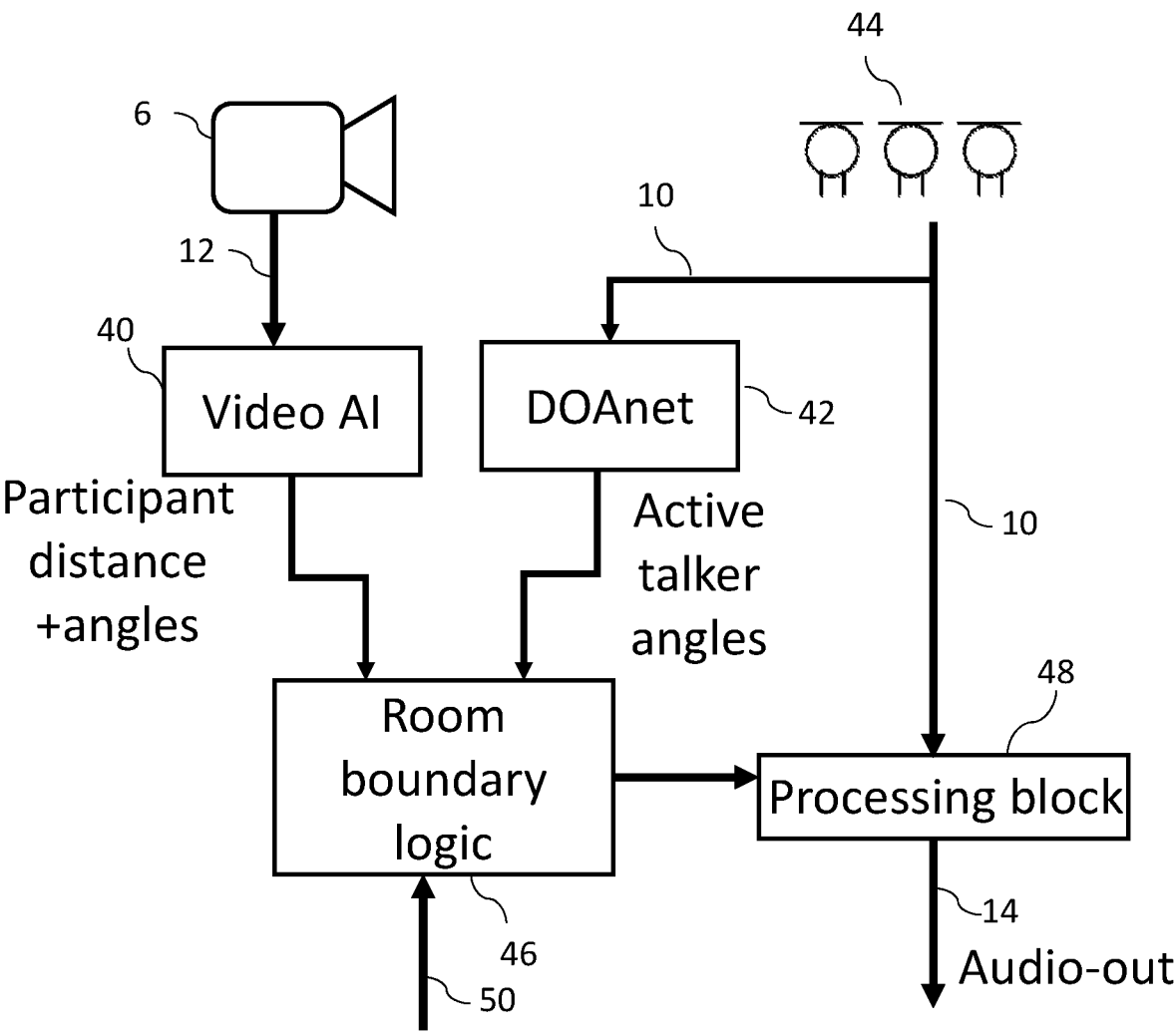
FIG. 3 schematically illustrates a flow diagram of a device for processing audio signals in a video conference call according to one embodiment of the present disclosure.

FIG. 3 schematically illustrates a flow diagram of a device 2 for processing audio signals in a video conference call according to one embodiment of the present disclosure. The device of this embodiment uses visual information obtained by the camera which then undergo video processing to modulate acoustic signals. The device is configured for video conference calls by users who, typically, take the call from an open space office. Other participants of the call receiving audio (and video) from the participants in the open space office often report that the known video conference devices will pick up unwanted speech and/or noise from activities of others that are not participating in the meeting. These interfering audio sources may be located inside the same room as the active participants, e. g., open office space. The device 2 of the present disclosure provides a solution to these cases of unwanted audio pick up by implementing a virtual room boundaries and video data to modulate audio signals and thereby provide clean speech to other participants. In this particular embodiment, camera 6 captures the space where the video conference call is held and converts it into video data 12. Audio data 10 are generated by a microphone array 44 configured to pick up sound present in the space of the video conference call. The method comprises determining, based on the video data, presence of one or more meeting participants. The video data 12 may be used for identifying presence of people relevant and not relevant for the video conference call. To determine presence of people in the video data 12 AI-based head and body detection method 40 (video AI) may be used. Alternatively, various other techniques may be used, such as face recognition, object tracking, machine learning, or any other methods know in the art. Apart from just determining the presence of participants and non-participants, the video AI method 40 may also determine distance from the camera 6 of the identified people as well as angular distances between the camera and the identified people. From the audio data 10, speech signals can be determined. The audio data 10 may be passed to a DOAnet block 42 configured to determine one or more directions of arrival (DOA) of one or more speech signals in the audio data 10. The DOAnet block 42 may utilize trained neural networks or more traditional DOA algorithms in the determination of the one or more DOAs. The DOAs of the speech signals from the audio data 10 and the distance and angular distance of the identified participants from the video data 12 are correlated in a room boundary logic block 46. The correlation may comprise associating one or more DOAs with one or more positions of identified people. The room boundary logic block 46 may receive a room boundary input 50, and determine virtual room boundaries based on the room boundary input 50. The room boundary input 50 may be automatically determined by the room boundary logic block 46, or it may be obtained as a user input. The correlation between the one or more relative positions of the identified people and the one or more DOAs of the identified speech signals may be provided as information in the audio processing of the audio data 10. The audio data 10 is modified in the processing block 48. The processing block 48 is configured to modify the audio data 10 based on the determined correlation between the video data 12 and the audio data 10 and the virtual room boundaries. The output from the room boundary logic 46 may be in the form frequency bin to be modified, e.g., the frequency bins may correspond to speech signals from people outside the virtual room boundaries. The processing block 48 may be configured to attenuate or suppress speech signals correlated with people outside the virtual room boundaries. The processing block 48 may be configured to perform further processing on the audio data 10, such as echo control, denoising, dereverberation, beamforming, and/ or various filtering. The processing block is configured to output an output audio signal 14.

Although particular features have been shown and described, it will be understood that they are not intended to limit the claimed disclosure, and it will be made obvious to those skilled in the art that various changes and modifications may be made without departing from the scope of the claimed disclosure. The specification and drawings are, accordingly to be regarded in an illustrative rather than restrictive sense. The claimed disclosure is intended to cover all alternatives, modifications and equivalents, as well as combination of various embodiments illustrated in the figures.

LIST OF REFERENCES

2 video conference device
4 microphone(s)
6 camera(s)
8 processing unit
10 audio data
12 video data
14 output audio data
20 method
22 determining virtual room boundaries
24 obtaining audio data
26 obtaining video data
28 correlating audio and video data
30 modifying audio data
32 generating output audio data
40 video data processing
42 audio data processing
44 microphone array
46 correlation block
48 audio process
50 room boundary input

The invention claimed is:

1. A method for processing audio signals in a video conference call, the method comprising:

determining virtual room boundaries that define space relevant for the video conference call based on an initial audio signal that includes background noise and an initial video signal, obtaining, by at least one input transducer, audio data;

obtaining, by at least one camera, video data;

correlating the video data and audio data;

modifying the obtained audio data on the basis of the correlation and the determined virtual room boundaries to generate output audio data.

2. The method of claim 1, further comprising:

determining one or more speech signals present in the audio data.

3. The method according to claim 2, further comprising:

extracting, from the determined speech signals, directions of arrival of the speech signals.

4. The method of claim 1, further comprising:

determining, based on the video data, a presence of one or more meeting participants.

5. The method of claim 4, wherein the correlating of the video and audio data includes correlating the one or more speech signals and the presence of one or more meeting participants.

6. The method according to claim 4, wherein the determining of the presence of one or more meeting participants comprises:

calculating relative positions of each identified participant, wherein the relative positions include at least one of the distance or the angle of a participant from the at least one camera.

7. The method according to claim 6, wherein the correlating of the video and audio data includes correlating the directions of arrival of the speech signals and the relative positions of each identified participant.

8. The method according to claim 4, further comprising:

identifying movements of the one or more participants within the virtual room boundaries and dynamically adapting participant related parameters based on the movements.

9. The method according to claim 1, further comprising:

assigning an identity number to each determined participant.

10. The method according to claim 1, further comprising:

attenuating any audio signal originating from outside of the virtual room boundaries.

11. The method according to claim 1, further comprising:

stopping one or more adaptive algorithms from adapting to speech detected outside of the virtual room boundaries.

12. The method according to claim 1, further comprising:

determining a biomarker parameter for each participant, and including the biomarker parameter in correlation of the video data and audio data.

13. The method according to claim 12, wherein the biomarker parameter comprises at least one of a lip movement parameter, gaze parameter, a face parameter, a body orientation parameter, a face landmark parameter, or a body landmark parameter.

14. The method according to claim 1, wherein the method is performed by a processing unit.

15. A video conference device for processing audio signals in a video conference call, the device comprising:

one or more input transducers for obtaining audio data, one or more cameras for obtaining video data, and a processing unit configured to:

determine one or more virtual room boundaries that define space relevant for a video conference call based on an initial audio signal included in the obtained audio data that includes background noise and an initial video signal included in the obtained video data, determine a correlation between the obtained video data and the obtained audio data, and modify the obtained audio data based on the determined correlation and determined virtual room boundaries to generate output audio data.

* * * * *